United States Patent [19]

Beck

[11] Patent Number: 4,598,132
[45] Date of Patent: Jul. 1, 1986

[54] CATALYST SYSTEM AND THE USE THEREOF FOR THE PRODUCTION OF EPDM RUBBER

[75] Inventor: Manfred Beck, Cologne, Fed. Rep. of Germany

[73] Assignee: Bunawerke Huls GmbH, Marl, Fed. Rep. of Germany

[21] Appl. No.: 780,322

[22] Filed: Sep. 25, 1985

Related U.S. Application Data

[63] Continuation of Ser. No. 623,090, Jun. 21, 1984, abandoned.

[30] Foreign Application Priority Data

Jul. 26, 1983 [DE] Fed. Rep. of Germany ....... 3326839

[51] Int. Cl.$^4$ ................................................ C08F 4/44
[52] U.S. Cl. ..................................... 526/142; 525/247; 525/445; 526/281; 526/282; 526/283
[58] Field of Search ............... 526/142, 281, 282, 283; 525/247, 445

[56] References Cited

U.S. PATENT DOCUMENTS

| | | | |
|---|---|---|---|
| 3,706,718 | 12/1972 | Lovelers | 526/142 |
| 4,161,462 | 7/1979 | Bocharov et al. | 526/142 |
| 4,182,811 | 1/1980 | Bocherov et al. | 526/142 |

*Primary Examiner*—Paul R. Michl
*Assistant Examiner*—Alex H. Walker
*Attorney, Agent, or Firm*—Connolly and Hutz

[57] ABSTRACT

EPDM rubbers having improved properties are obtained by carrying out the polymerization using a catalyst system consisting of a vanadium compound, an aluminum halide and an ester, the ester being a polymer containing ester groups.

5 Claims, No Drawings

CATALYST SYSTEM AND THE USE THEREOF FOR THE PRODUCTION OF EPDM RUBBER

This is a continuation of application Ser. No. 623,090 filed June 21, 1984, now abandoned.

This invention relates to a catalyst system and to the use thereof for the production of copolymers of $C_2$–$C_6$ olefin mixtures, for example ethylene and propylene, and a non-conjugated polyene (EPDM rubbers).

The production of EPDM rubbers is known. Such rubbers are produced from the above-mentioned monomers using catalysts based on vanadium compounds and aluminium-organic compounds which are soluble in hexane. The incorporation of the diene depends on the type of catalyst, and the distribution of the diene along the polymer chain which influences the cross-linking properties. The more regular the distribution, the more favourable the cross-linking behaviour of the rubber. There is a need for EPDM rubbers which are improved in this respect. A problem in the production of ethylene/propylene/diene polymers, in particular when dicyclopentadiene is used as diene and when ethyl aluminium sesquichloride is used as the catalyst component, is the formation of long-chain-branched polymers. In extreme cases, polymers can be produced which are insoluble in the solvent used (gel). In these cases, apart from the need to avoid the gel formation, polymers which are branched to a lesser extent are required during production, because the rheological behaviour thereof leads to an improved processibility.

DE-OS 24,17,937 states that the processibility of EPDM may be improved as a result of using a catalyst system consisting of
(1) an alkyl aluminium halide,
(2) at least one transition metal compound, for example a vanadium compound, and
(3) a low molecular weight ether or ester having an aromatic and/or an α-olefinic radical.

The use of saturated carboxylic acid esters does not produce any effect. The unsaturated esters and ethers which are used suffer from the disadvantage of a high volatility, which entails recycling problems in technical large-scale plant. Furthermore, most of these compounds have an intensive smell which is transferred to the rubber.

It has now been found that improved EPDM rubbers are obtained without these disadvantages, if a catalyst system is used which contains a polymer containing ester groups. When the catalyst systems according to the present invention are used, ethylene, propylene or other $C_2$–$C_6$ olefin mixtures and a polyene are polymerised in a hydrocarbon solvent using a catalyst system consisting of
(1) a vanadium compound
(2) an aluminium halide corresponding to the formula $AlR_{3-n}X_n$, wherein R represents $C_1$–$C_8$-alkyl, X represents halogen and n represents 1 or 2, and
(3) a polymer containing ester groups.

Thus, the present invention provides a catalyst system consisting of
(1) a vanadium compound,
(2) an aluminium halide corresponding to the formula $AlR_{3-n}X_n$, wherein R represents $C_1$–$C_8$ alkyl, X represents halogen and n represents 1 or 2, and
(3) a polymer containing ester groups.

This invention also provides a process for the polymerisation of mixtures consisting of at least two $C_2$–$C_6$ olefins and a polyene in a hydrocarbon using the above-mentioned catalyst system.

Catalysts of this type produce EPDM rubbers based on ethylidenenorbornene, the sulphur vulcanisates of which have improved properties compared to the sulphur vulcanisates which are produced without polymers containing ester groups. Depending on the type of polymer containing ester groups, different vulcanisate properties, such as tearing resistance, modulus or the Shore hardness may be improved. In the case of the copolymerisation of dicyclopentadiene, the formation of gel which usually occurs is almost completely suppressed. This has considerable advantages when the technical process is carried out, since the installations only have to be disconnected infrequently for cleaning purposes. Furthermore, polymers which are branched to a substantially smaller extent are obtained, and their processibility is improved.

Another advantage of the present process is that the addition of polymers containing ester groups does not present any recycling problems in technical installations, because the polymers containing ester groups generally remain in the rubber under the working-up conditions, and furthermore there are no problems of odour, because polyesters are odourless, unlike low molecular weight esters.

The polymers containing ester groups have a degree of polymerisation of from 3 to 5000, preferably from 5 to 1000, and they may belong to the following substance classes:

1. Type: acrylate polymers: (co-) polymers or oligomers of α,β-unsaturated mono- and polycarboxylic acid esters, for example polybutylacrylate or copolymers thereof with vinyl-, allyl- or diene compounds on their own or combined, copolymers with itaconic acid esters or citraconic acid esters. The OH component of the ester may be substituted $C_1$–$C_{20}$ alkyl or substituted phenyl.
2. Type: vinyl ester polymers: polyvinyl acetate and copolymers thereof, for example ethylene/vinyl acetate copolymer.
3. Type: polyesters of dicarboxylic acids and dialcohols with branched or straight-chain $C_2$–$C_{36}$ dicarboxylic acids, $C_4$–$C_{40}$ unsaturated dicarboxylic acids, $C_2$–$C_{36}$ dialcohols, $C_4$–$C_{40}$ unsaturated diols.
4. Type: polyesters of hydroxy carboxylic acids, for example γ-hydroxy butyric acid, ε-hydroxy caproic acid, p-hydroxy benzoic acid, hydroxy methyl benzoic acid, ricinoleic acid and hydrogenated ricinoleic acid.

The upper limit of the degree of polymerisation of the polymers containing ester groups is determined by the solubility of these compounds in the reaction medium. Vanadium oxychloride, vanadium tetrachloride, vanadic acid ester, chlorovanadic acid ester and vanadium trisacetyl acetonate for example may be used as vanadium compounds, the esters being derived from $C_1$–$C_{10}$ alkanols which may be substituted by halogen.

Examples of aluminium alkyls of the $AlR_{3-n}X_n$ type include diethyl aluminium chloride, ethyl aluminium sesquichloride, dibutyl aluminium chloride and ethyl aluminium sesquibromide. Ethyl aluminium sesquichloride and diethyl aluminium chloride are preferably used.

Non-conjugated dienes, trienes and polyenes, for example vinyl polybutadiene are particularly suitable as polyenes. Non-conjugated dienes, in particular ethylidenenorbornene and dicyclopentadiene are preferred.

Polymers which contain ester groups and are soluble in hexane are preferred as polymers containing ester groups. Polyacrylates and esters of dicarboxylic acids and diols, for example of hexane diol and dimeric oleic acid are particularly preferred.

Vanadium oxychloride and chlorovanadic acid ester are preferred vanadium compounds.

The efficiency of the catalyst is affected by the ratio of the ester groups per mol of transition metal compound. From 0.1 to 100 mols of ester groups, preferably from 0.2 to 10 mols may be used per mol of metal compound. The molar ratio of aluminium compound to vanadium compound is from 3:1 to 100:1, in particular from 5:1 to 50:1 and preferably from 10:1 to 40:1.

The polymerisation temperature may range between 10° and 120° C. Temperatures of from 30° to 70° C. are preferred.

The process is carried out in hydrocarbons or in mixtures thereof. Examples include propene, butene, pentane, hexane, cyclohexane, benzene, and toluene. Hexane is preferred, the products of the reaction being virtually soluble therein.

After polymerisation, the reaction is stopped by adding water or other suitable substances, and stabilisers are then added, for example of the phenol type.

The EPDM is isolated by coagulation in hot water with evaporation of the solvent, filtration and drying.

The Examples which are described in the following state the influence of the catalyst system on the rheological behaviour and on the vulcanisate values of the EPDM rubbers. As a result of using the catalyst system according to the present invention, it is possible to produce ethylidenenorbornene EPDM types which exhibit an improved network in the vulcanisate. The formation of gel is almost completely avoided as a result of using the catalyst of this invention during the production of dicyclopentadiene-EPDM types. The rheological properties are improved.

The influence of the new catalyst system on the visco-elastic behaviour of the polymers may be readily indicated using the rheological test published by R. Koopmann and H. Kramer (ASTM-Symposium On Processibility And Rheology Of Rubber, 21. June 1982, Toronto, published in "Kautschuk, Gummi and Kunststoffe" 36 (1983), P. 108). This test is concerned with measuring the Mooney Relaxation MR, and is also concerned with an extended Defo test. This test showed that polymers according to the present invention having a reduced branching are formed. It was surprising that substances which carry a large number of ester groups exert a marked influence on the viscoelastic behaviour of the polymers.

The catalyst may be produced by adding the components together in any manner. A simplification of the process lies in pre-mixing the vanadium compound and the polymer containing ester groups and then metering this mixture into the catalyst production.

EXAMPLES 1 TO 4

The following quantities of the substances listed below are metered into a 2 liter reactor per hour at 50° C.:

| | |
|---|---|
| 2,7 | l of n-hexane |
| 100 | g of ethylene, |
| 370 | g of propylene |
| 9 | g of ethylidenenorbornene (EN), |
| 0,767 | g of ethyl aluninium sesquichloride (EASC), |
| 0,03 | g of $VOCl_3$, and |
| 0,43 | g of butyl perchloro crotanate (BPCC). |

The catalyst components were dissolved separately in some of the hexane, and EN in the rest of the hexane. Furthermore, the substances stated in Table I were pumped in (g/h).

The reaction was carried out while maintaining the contents of the reactor constant, i.e. the same volumes were removed per hour as were added.

The values given in Table I were found.

TABLE 1

| Example | Aniline | Ester Quantity | Ester Type | ML-4' (100° C.) | MR | $V_{10}$ | $-n_1$ | DE30 | DH30 | $\frac{ML}{DE30} \times 100$ |
|---|---|---|---|---|---|---|---|---|---|---|
| 1 | 0.2 | 0.5 | A | 99.3 | 2.8 | 103.1 | 0.482 | 14.7 | 11.6 | 676 |
| 2 (comparison) | 0.15 | — | — | 101.3 | 5.4 | 146.0 | 0.591 | 24.1 | 15.1 | 420 |
| 3 | 0.15 | 0.164 | B | 106.1 | 3.8 | 105.2 | 0.472 | 14.1 | 11.8 | 752 |
| 4 | 0.14 | 0.825 | A | 71.8 | 1.4 | 49.0 | 0.372 | 9.5 | 5.6 | 755 |

A = Polyester of hexanediol-1,6 and dimeric oleic acid having a molecular weight of 10.000 (determined by vapour pressure osmometry).
B = Polybutyl acrylate having a relative solution in toluene (5 g/l) at 25° C. of 44 $cm^3$/g.

The mixture removed from the reactor was stopped with 100 ml/h of water, and then 0.2 g/h of 3-(4-hydroxy-3,5-di-tert-butyl phenyl)-propionic acid octadecyl ester were added as stabiliser and the polymer was isolated by precipitation with ethanol. After drying (14 hours, 70° C.), the samples were tested according to the Defo- and Mooney-relaxation method (MR) of Koopmann and Kramer. Table 1 shows that test product 2 (without the addition of ester) has the highest Mooney relaxation value of products 1 to 3 based on the closely adjacent Mooney values—these products thus being comparable. The MR values of test 1 (polyester A) and test 3 (polybutyl acrylate) are clearly reduced.

A comparison between tests 1 and 4 shows the influence of the quantity of polyester A. Virtually analogous results are produced by the Defo measurements. The ratio of ML:DE 30×100 may be used as the characteristic number. The higher this characteristic number, i.e. the lower the DE at a given ML value, the less branched is the polymer.

EXAMPLES 5 TO 6

Two polymers were produced analogously to the general method described in Examples 1 to 4 and one of these polymers was produced using a copolymer of ethylene/vinyl acetate (VA content 34%, Mn 3800, $\ln\eta_{rel}$ 0.115) (Table 2). Different production data: 4 g/h EN, temperature 45° C.

TABLE 2

| Example | Ester | ML 4' (100° C.) | MR | I.V. | $V_{10}$ | DE30 | $-n_1$ |
|---|---|---|---|---|---|---|---|
| 5 | — | 65.0 | 5.1 | 206 | 91.1 | 24.4 | 0.593 |

TABLE 2-continued

| Example | Ester | ML 4' (100° C.) | MR | I.V. | $V_{10}$ | $DE_{30}$ | $-n_1$ |
|---|---|---|---|---|---|---|---|
| (Comparison) 6 | 0.3 | 62.8 | 3.1 | 206 | 75.7 | 20.9 | 0.534 |

Compared to Comparative Example 5, Example 6 shows the influence of polyvinyl acetate copolymers on the visco-elastic behaviour of EPDM.

EXAMPLES 7 TO 8

EPDM polymers were produced with different quantities of EN analogously to the general method of Examples 1 to 4 (Table 3).

TABLE 3

| Example | EN | polybutyl acrylate | ML 4' (100° C.) | DH | DE | Iodine No. | MR | $\frac{ML}{DE} \times 100$ | Propylene (%) |
|---|---|---|---|---|---|---|---|---|---|
| 7 (Comparison) | 12 | — | 79 | 10.5 | 26 | 19.1 | 6.3 | 304 | 51.3 |
| 8 | 12 | 0.14 | 89 | 10.5 | 17 | 18.9 | 4.5 | 524 | 46.0 |

Mixtures were produced according to the following formulation from the polymers of Examples 7 and 8 and were vulcanised for 45 minutes at 160° C.:

| polymer | 100 parts by weight |
|---|---|
| carbon black Corax 3 | 50 parts by weight |
| paraffin mineral oil | 10 parts by weight |
| zinc oxide, active | 2 parts by weight |
| stearic acid | 1 parts by weight |
| sulphur | 1.2 parts by weight |
| accelerator mercapto-benzthiazole | 1.4 parts by weight |
| tetramethylthiuram-disulphide | 0.2 parts by weight |
| amino salt of diisobutyl-dithiophosphoric acid | 0,5 parts by weight. |

Table 4 gives the vulcanisate properties. In comparison thereto, a standard EPDM type having ML4' (100° C.)=70, 54% ethylene content and 8 double bonds/1000 carbon atoms (Example 9) was vulcanised under the same conditions.

TABLE 4

| Example | F | D | M(100) | M(300) | H | E | C.S. |
|---|---|---|---|---|---|---|---|
| 7 | 15.0 | 400 | 2.9 | 11.6 | 70 | 52 | 13.1/46.4 |
| 8 | 15.7 | 355 | 3.5 | 14.2 | 72 | 56 | 11.3/48.8 |
| 9 (comparison) | 15.5 | 370 | 3.3 | 12.5 | 71 | 52 | 14.1/56.3 |

In this Table, F represents the tearing resistance, D the tearing elongation, M(100) the modulus at 100% elongation, M(300) the modulus at 300% elongation, H the Shore hardness A, E the rebound resilience and the C.S. the compression set.

The polymer obtained according to Example 8 using polybutyl acrylate produces a superior vulcanisate.

The product of Example 8 is improved in the modulus and also in the hardness and elasticity data, an indication of a more regular network formation.

EXAMPLES 10 TO 12

In this series of Examples, the vulcanisate values of a polymer produced with an increased quantity of ester and at elevated temperature are compared with those of comparative products. The polymers were produced analogously to Example 1, see Table 5 for modifications.

TABLE 5

| Example | EN | PBA | Temp. °C. | ML-4' (100° C.) | DH/DE | Iodine No. | $C_3$ |
|---|---|---|---|---|---|---|---|
| 10 | 12 | 0.21 | 60° | 70 | 6.9/18 | 19.6 | 42.0 |
| 11 (comparison) | 12 | — | 50° | 90 | 12.6/25 | 16.2 | 48.7 |
| 12 (comparison) | 12 | — | 60° | 77 | 8.8/21 | 20.2 | 48.0 |

Vulcanisates were produced at 160° C. and after a heating time of 45 minutes according to the mixture formulation described in Example 7 (comparison with Example 9). Table 6 shows that the polymer produced with ester is superior, in particular with respect to its tearing resistance. A more favourable modulus is achieved with a comparatively high elongation. The compression set is also improved.

TABLE 6

| Example | F | D | M(100) | M(300) | H | E | C.S. |
|---|---|---|---|---|---|---|---|
| 10 | 14.8 | 315 | 3.4 | 14.8 | 71 | 57 | 12.7/49.7 |
| 11 (comparison) | 10.2 | 255 | 3.4 | — | 71 | 58 | 12.7/50.1 |
| 12 (comparison) | 12.8 | 305 | 3.1 | — | 71 | 57 | 12.8/51.4 |
| 9 | 11.8 | 305 | 3.1 | — | 70 | 57 | 12.1/54.1 |

EXAMPLES 13 TO 18

These experiments show the influence of different types of ester. Production data as in Example 1, see Table 7 for modifications.

TABLE 7

| Example | EN | Ester Type | Ester mMol/h | ML-4' (100° C.) | DH/DE | Iodine No | $\frac{ML}{DE} \times 100$ |
|---|---|---|---|---|---|---|---|
| 13 | 9 | A | 1.28 | 69 | 5.4/10 | 14.7 | 690 |
| 14 | 9 | B | 1.28 | 104 | 10.8/15 | 14.8 | 693 |
| 15 | 9 | A | 0.80 | 80 | 7.1/11 | 14.8 | 727 |
| 16 | 9 | C | 0.80 | 72 | 4.9/10 | 13.9 | 720 |
| 17 | 9 | C | 0.32 | 90 | 8.3/16 | 14.1 | 563 |
| 18 | 9 | — | — | 89 | 10.0/20 | 13.3 | 445 |

TABLE 7-continued

| Example | EN | Ester Type | mMol/h | ML-4' (100° C.) | DH/DE | Iodine No | $\frac{ML}{DE} \times 100$ |
|---------|-----|------------|--------|------------------|-------|-----------|----------------------------|

(comparison)

Explanations to Column 3
A = Polyester of hexane diol/dimeric fatty acid, Mw 10.000
B = Polybutyl acrylate, L value 44 cm³/g
C = Polyester of adipic acid/octadecane diol -1,12; Mw 4,300

Table 8 gives the vulcanisate values obtained according to Example 7. Table 7 states the influence of different esters and also various quantities of esters. The characteristic number ML/DE×100 for the zero experiment 18 is the lowest at 445, whereas the polymers 16 and 17 obtained according to the present invention produce clearly higher characteristic numbers when the same quantity, and also a slightly lower quantity (mols of COOR groups) of ester were used. Compared to the zero experiment, all the "ester" polymers have higher iodine numbers.

TABLE 8

| Example | F | D | M(300) | H23/70 | E23/70 | C.S. |
|---------|------|-----|--------|--------|--------|-----------|
| 13 | 13.0 | 345 | 12.1 | 72/71 | 57/61 | 11.3/53.0 |
| 14 | 15.5 | 375 | 12.9 | 72/71 | 58/63 | 10.2/50.8 |
| 15 | 14.7 | 375 | 12.2 | 71/71 | 58/62 | 11.0/54.8 |
| 16 | 15.1 | 380 | 12.1 | 72/71 | 57/61 | 13.1/54.7 |
| 17 | 13.5 | 355 | 12.1 | 72/71 | 58/62 | 10.1/53.4 |
| 18 | 13.5 | 350 | 12.3 | 72/71 | 57/64 | 10.8/56.7 |

The vulcanisate values of Examples 14, 15 and 16 have advantages in the tearing strength compared to the comparative Example 18. Experiment 14 produces a positive result in the modulus test (addition of polybutyl acrylate). A further differentiation is provided by considering the differences of the E 23°/E 70° C. values. This difference is highest in the Comparative Experiment 18 (Δ=7 units). The polymers produced with esters provide Δ values of only four units. The compression set under intensified conditions (100° C./70 hours) also shows the superiority of polymers produced with esters.

EXAMPLES 19 TO 21

These Examples verify the advantage of the catalyst system according to the present invention during the production of EPDM types with dicyclopentadiene (DCP) (Table 9).

EXAMPLES 22 TO 24

These examples show the efficacy of the combination of diethyl aluminium monochloride (DEAC) with a polymer containing ester groups. No gel separation in the reactor was observed during the production of these highly unsaturated types.

PROCESS CONDITIONS

Hexane 2.7 l/h, ethylene 90 g/h, propylene 370 g/h, BPCC 0.4 g/h, VO Cl₃ 0.043 g/h, DEAC 1.202 g/h, temperature 40° C., polyester of example 19 0.6 g/h.

TABLE 10

| Example | DCP g/h | Ester g/h | Iodine No. | Ml-4' (100°) | DH/DE | Propylene % | F | D | M(300) | H(23°) | E(23/70°) |
|---------|---------|-----------|------------|--------------|---------|-------------|------|-----|--------|--------|-----------|
| 22 | 15 | 0.6 | 12.5 | 55 | 11.0/32 | 43.0 | 19.9 | 354 | 16.4 | 68 | 49/51 |
| 23 | 18 | 0.6 | 14 | 63 | 14.7/28 | 42.1 | 20.4 | 328 | 18.2 | 67 | 49/52 |
| 24 | 25 | 0.6 | 20.1 | 70 | 16.7/41 | 39.5 | 22.9 | 354 | 19.8 | 68 | 49/52 |

I claim:

1. In an improved process for the polymerization of mixtures comprising ethylene, propylene and a non-conjugated diene in a hydrocarbon diluent by copolymerizing the mixture components in the presence of a catalyst comprising:
    (a) a vanadium compound,
    (b) an aluminum halide of the formula $AlR_{3-n}X_n$, wherein R is $C_1$-$C_8$-alkyl, X is halogen and n is 1 to 2, and
    (c) an ester,
    wherein the improvement is that said ester is a polymer containing ester groups which has a degree of polymerization of from 5 to 1000, the catalyst composition is soluble in hexane, remains in the product copolymer rubber under working-up conditions, and the polymerization is carried out at a temperature of from 10° to 120° C.

2. A process as claimed in claim 1 wherein the polymerization temperature is from 30° to 70° C.

3. A process as claimed in claim 1 wherein the diene is ethylideneorbornene or dicyclopentadiene.

4. A process as claimed in claim 1 wherein the catalyst contains 0.1 to 100 mols of ester groups per mol of vanadium compound and the molar ratio of aluminum compound to vanadium compound is from 3:1 to 100:1.

5. A process as claimed in claim 1 wherein the catalyst contains 0.2 to 10 mols of ester groups per mol of vanadium compound and the molar ratio of aluminum compound to vanadium compound is from 10:1 to 40:1.

* * * * *

TABLE 9

Production Conditions:
Hexane 2.7 l/h, Ethylene 100 g/h, Propylene 370 g/h; BPCC 0.4 g/h, VOCl₃ 0.043 g/h;
(for abbreviations see Example 1).

| Example | DCP (g/h) | Aniline (g/h) | Ester (g/h) | EASC (g/h) | Temp. °C. | ML-4' 100° C. | DH/DE | Iodine No. | Gel[2] |
|---------|-----------|---------------|-------------|------------|-----------|----------------|---------|------------|--------|
| 19 | 10 | — | 0.6[1] | 1.235 | 60 | 87 | 18.1/38 | 8.1 | 1 |
| 20 (comparison) | 10 | 0.24 | — | 1.235 | 60 | 116 | 26.0/49 | 8.9 | 4 |
| 21 | 10 | 0.18 | 0.9[3] | 1.235 | 60 | 76 | 16.2/38 | 8.6 | 1 |

[1]Polyester of hexane diol-1,6 and dimeric oleic acid; Mw 10,000;
[2]Separation of gel: 1: on the catalyst nozzle, slight, otherwise no separation, 4: on all parts of the reactor.
[3]Polyester of adipic acid/octadecane diol-1,2; Mw 4,300.